United States Patent [19]

Yamasaki et al.

[11] Patent Number: 5,146,328
[45] Date of Patent: Sep. 8, 1992

[54] COLOR SIGNAL NETWORK SYSTEM

[75] Inventors: Toru Yamasaki; Hiroaki Ikegami; Noriaki Seki; Yoshiharu Hibi; Yoshihiro Terada, all of Kanagawa, Japan

[73] Assignee: Fuji Xerox Corporation, Ltd., Tokyo, Japan

[21] Appl. No.: 729,591

[22] Filed: Jul. 15, 1991

[30] Foreign Application Priority Data

Jul. 18, 1990 [JP] Japan .................................. 2-189740

[51] Int. Cl.$^5$ ............................................. H04N 5/202
[52] U.S. Cl. ........................................ 358/164; 358/80
[58] Field of Search ................................. 358/75–80, 358/164

[56] References Cited

U.S. PATENT DOCUMENTS 4,667,228  5/1987  Kawamura et al. ................. 358/80
4,667,250  5/1987  Murai ................................. 358/75
4,677,465  6/1987  Alkofer ............................... 358/75
4,882,621  11/1989 Suzuki et al. ....................... 358/80
4,931,864  6/1990  Kawamura et al. ............... 358/164
4,959,712  9/1990  Tsuzuki et al. ..................... 358/75

Primary Examiner—Stephen Brinich
Attorney, Agent, or Firm—Finnegan, Henderson, Farabow, Garrett and Dunner

[57] ABSTRACT

A color converter capable of conversions between various kinds of color signals appropriate for use over a network (i.e., RGB signals, various luminance/-chromaticity separated signals that are expressed by linear transformations of said RGB signals, and CIE LAB signals, which signals may or may not be gamma-corrected) and the internal color signals of devices connected to the network can be realized by rewriting associated coefficients and constants using the same circuit. Accurate color conversions can always be accomplished with an inexpensive system layout.

10 Claims, 10 Drawing Sheets

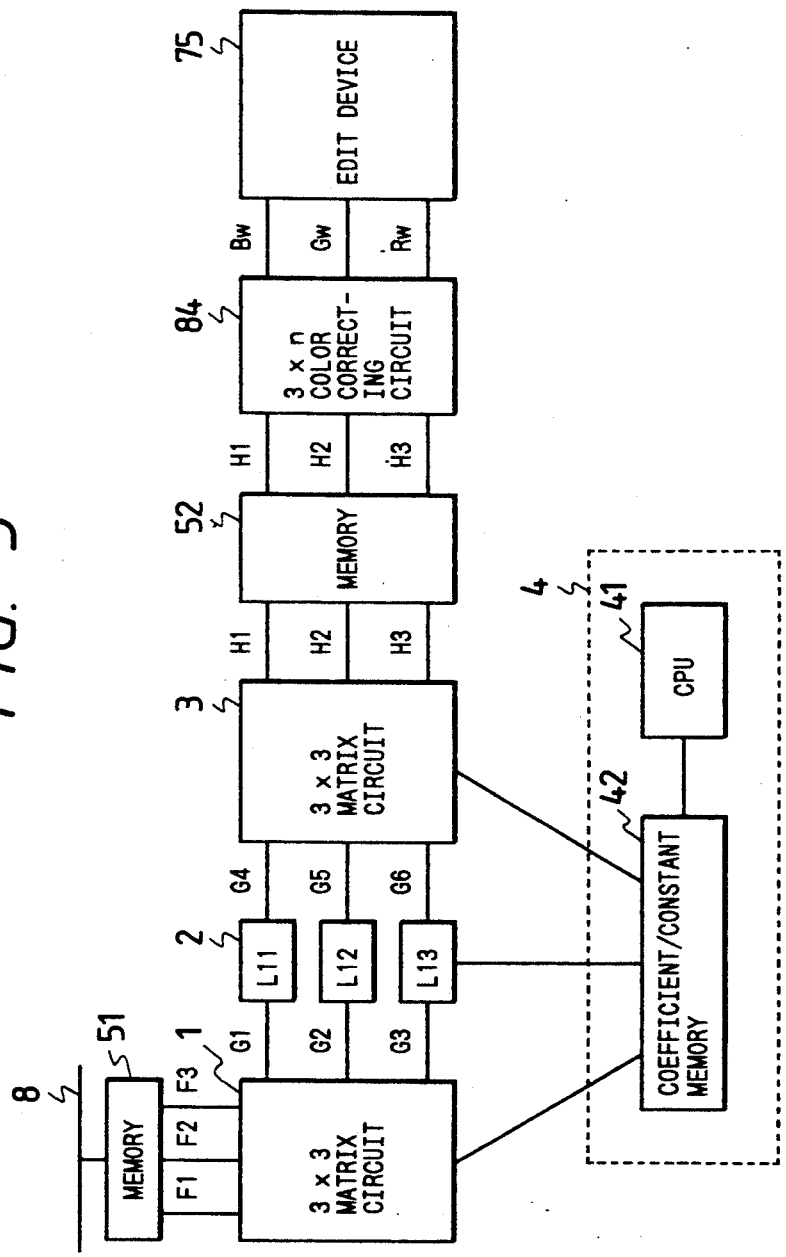

COLOR SIGNAL NETWORK SYSTEM

BACKGROUND OF THE INVENTION

The present invention relates to a color signal network system for performing conversions on color signals.

As example of the apparatus for outputting color signals that has known prior art device for performing color signal conversions is described in Unexamined Published Japanese Patent Application No. 145770/1985. FIG. 9 shows a layout for the apparatus proposed in that patent which is used to prepare a printing color-separated plate. As shown, a color document 101 is wound onto a scan drum 102 and the image on the document is read with a scanning mechanism 103. Three color signals R, G and B obtained by color separation are sent to a logarithmic converting stage 105 where they are converted to complete or partial logarithmic colorimetric signals R', G' and B'. The signals stage 105 are supplied into the first correction circuit 106 where color-separated plate signals C, M and Y for subtractive mixing and, optionally, K are generated. These color-separated plate signals C, M and Y are fed into a superposing stage 107 where selective correction signals Ck, Mk and Yk are superposed on C, M and Y. The resulting superposed signals C', M' and Y' are supplied into a recording mechanism 108 for performing color recording on associated recording media 110 that are wound onto recording drums 109.

The apparatus for preparing a printing color-separated plate that is proposed in Unexamined Published Japanese Patent Application No. 145770/1985 is equipped with a color signal output device 112. This color signal output device 112 is supplied with the three color signals R, G and B obtained from the scanning mechanism 103. The input signals are converted to complete or partial logarithms in a converting stage 113 to generate colorimetric signals R', G' and B'. These colorimetric signals R', G' and B' are subjected to matrix operations by the following Eq. (1) and converted to chromaticity signals x, y and lightness signals z (luminance/chromaticity separated signals):

$$x = a_{11}R' + a_{12}G' + a_{13}B'$$

$$y = a_{21}R' + a_{22}G' + a_{23}B'$$

$$z = a_{31}R' + a_{32}G' + a_{33}B' \qquad (1)$$

In the apparatus under discussion, the signal output device 112 uses those luminance/chromaticity separated signals to compute the amounts of adjustment of hue, saturation and lightness and generates color control signals associated with these attributes. Based on the resulting color control signals, the signal output device 112 calculates the aforementioned selective correction signals Ck, Mk and Yk, which are fed into the superposing stage 107 and respectively added to output signals C, M and Y from the first correction circuit 106.

As described above, the three color signals R, G and B obtained by color separation in the apparatus under discussion are converted to luminance/chromaticity separated signals by the combination of conversions to complete (or partial) logarithms and matrix operations. Therefore, conversion to correct color signals (colorimetric values) is impossible unless the characteristics of separation into three colors are color matching functions. If, in this situation, one wants to supply color signals into a network, accurate color reproduction is not likely to occur at the receiver's end.

Another disadvantage of the apparatus is that although it is capable of conversion to a certain type of luminance/chromaticity separated signals, conversions to various types of color signals (e.g. CIE XYZ and NTSC YIQ) are impossible unless it has a means of rewriting both the contents of the logarithmic (or partial logarithmic) converting states and the coefficients of matrices. This presents a problem if the receiver accepts only different types of color signals than those which are sent out from the apparatus.

If the characteristics of separation into three colors are color matching functions and if the logarithmic (or partial logarithmic) converting stage is composed of one-dimensional look-up tables (hereunder abbreviated as LUTs), the availability of the means of rewriting the contents of LUTs and the coefficients of matrices enables conversions to several accurate luminance/chromaticity separated signals using the LUTs and performing matrix computations. A few comments here on this point may be in order.

If the characteristics of separation into three colors are color matching functions, the three color signals R, G and B obtained by color separation are essentially colorimetric values. However, nonlinear sensors or circuits must be corrected (scanner calibrated) and one-dimensional LUTs are used to perform this correction. It is known that the essentially colorimetric three signals R, G and B can be accurately converted to CIE XYZ signals by matrix computations of the same form as Eq. (1). In other words, R, G and B can be converted to correct chromaticity signals X and Z and luminance signal Y. When the receiver is a CRT, the one-dimensional LUTs may be adapted to perform simultaneously the scanner calibration and the gamma correction of the image-receiving tube of the CRT. In this case, the one-dimensional LUTs will output gamma-corrected colorimetric values RGB. These RGB signals can also be converted to gamma-corrected colorimetric values NTSC YIQ by matrix computations of the same form as Eq. (1). In other words, conversion to correct chromaticity signals I and Q and luminance signal Y can be accomplished. Further, if the matrices are set as unit matrices, the colorimetric signals R, G and B can be output unaltered (without gamma correction).

As described above, if the characteristics of separation into three colors are color matching functions and if one-dimensional LUTs, a means of computing matrices and a means of rewriting the contents of the LUTs and the coefficients of matrices are available, conversion can be made not only to RGB signals (which may be gamma-corrected) but also to various correct luminance/chromaticity separated signals (which may also be gamma-corrected) that are expressed by linear transformations of RGB signals. Even in this case, however, accurate conversion to CIE LAB signals cannot be achieved for the following reasons.

CIE LAB (L*a*b*) signals are calculated from CIE XYZ signals by the following Eq. (2):

$$L^* = 116f(Y/Y_0) \quad (2)$$
$$a^* = 500f(X/X_0) - 500f(Y/Y_0)$$
$$b^* = 200f(Y/Y_0) - 200f(Z/Z_0)$$
$$f(t) = (t)^{**}(1/3) - 16/116:1 \geq t > 0.008856$$
$$= 7.787t \quad :0 \leq t \leq 0.00856$$

$X_0Y_0Z_0$ is the chromaticity of the white reference

Note that solving Eq. (2) inversely for $f(X/X_0)$, $f(Y/Y_0)$ and $f(Z/Z_0)$ gives $$f(X/X_0) = a^*/500 + L^*/116$$

$$f(Y/Y_0) = L^*/116$$

$$f(Z/Z_0) = L^*/116 - b^*/200 \quad (2)$$

Hence, in order to accomplish accurate conversion from colorimetric RGB signals to CIE LAB signals, the following three blocks are necessary: first, a means of computing 3×3 matrices for obtaining CIE XYZ signals; second, one-dimensional LUTs for obtaining $f(X/X_0)$, $f(Y/Y_0)$ and $f(Z/Z_0)$ singles; third, a means of computing 3×3 matrices for obtaining CIE LAB signals from those $f(X/X_0)$, $f(Y/Y_0)$ and $f(Z/Z_0)$ signals. In other words, the combination of one-dimensional LUTs a matrix computing means and a means of rewriting both the contents of the LUTs and the coefficients of matrices is insufficient to achieve accurate conversion to CIE LAB signals.

Consider here a network to which a plurality of senders and receivers of color signals are connected. Various senders send out various color signals and each receiver must decode those signals accurately so that they are converted to its own internal color signals (CMY signals if the receiver is a printer). An example of the recording apparatus that is furnished with a known prior art device for performing this conversion of color signals is described in Unexamined Published Japanese Patent Application NO. 238937/1989. FIG. 10 shows a layout for the color image processing apparatus proposed in that patent. In this apparatus, three color separation signals obtained from a reader unit 216 and color signals supplied from a connected device 217 are converted to the same NTSC RGB signals, which are subjected to the steps of black generation and color correction to obtain a print using the CMYK color model. The operation of the apparatus is described in a little more specific way. The reader 216 reads a color document of interest and produces three color separation signals R, G and B. These signals are fed to a color converter circuit 206 where they are converted to NTSC RGB signals by matrix computations using the coefficients restored in a memory 209. In the present discussion, the connected device 217 is assumed to produce NTSC YIQ signals. These signals are also fed to the color converter circuit 206 where they are converted to NTSC RGB signals by matrix computations using the coefficients restored in a memory 210. The matrix computations for achieving this conversion to NTSC RGB signals are represented by the following Eq. (3):

$$Rn = 1.00Y + 0.96I + 0.63Q$$

$$Gn = 1.00Y - 0.28I - 0.64Q$$

$$Bn = 1.00Y - 1.11I + 1.72Q \quad (3)$$

Note that solving Eq. (3) inversely for YIQ gives $$Y = 0.30Rn + 0.59Gn + 0.11Bn$$

$$I = 0.60Rn - 0.28Gn - 0.32Bn$$

$$Q = 0.21Rn - 0.52Gn + 0.31Bn \quad (3)$$

Unexamined Published Japanese Patent Application No. 238937/1989 discloses not only the use of a 3×3 matrix; it also teaches the use of matrices containing higher-order terms in order to accomplish more accurate color signal conversions.

However, the apparatus proposed in that patent does not have one-dimensional LUTs and if it is supplied with gamma-corrected NTSC YIQ signals, the apparatus is incapable of conversion to accurate (not gamma-corrected) NTSC RGB signals. To deal with this problem, the conversion curves in a density converter circuit 211 may be modified in such a way as to include a capability for dismissing the gamma correction. In fact, however, the apparatus is not provided with a means of altering the forms of those conversion curves.

As a further problem, the apparatus also does not take CIE LAB signals into account and even matrices containing higher-order terms are incapable of achieving accurate conversion from CIE LAB signals to NTSC RGB signals. The reason for this is as follows: CIE LAB signals are computed from CIE XYZ signals by Eq. (2), so in order to achieve accurate conversion from CIE LAB signals to NTSC RGB signals, three blocks, namely, a 3×3 matrix computing means for obtaining $f(X/X_0)$, $f(Y/Y_0)$ and $f(Z/Z_0)$ signals, one-dimensional LUTs for obtaining CIE XYZ signals, and a 3×3 matrix computing means for obtaining NTSC RGB signals from the CIE XYZ signals, are necessary. In other words, accurate conversion to CIE LAB signals cannot be accomplished merely by substituting matrices containing higher-order terms for the conversions achieved by those three blokes.

As described above in detail, color signal outputting apparatus and color recording apparatus that are equipped with conventional color converting devices have been unable to achieve accurate conversion from the internal color signals of those apparatus to various color signals (RGB signals, various luminance/chromaticity separated signals that are expressed by linear transformations of RGB signals, and CIE LAB signals, which signals may or may not be gamma-corrected) and vice versa.

SUMMARY OF THE INVENTION

An object, therefore, of the present invention is to provide an inexpensive color converting device that is capable of achieving accurate conversion from the internal color signals of associated apparatus to various color signals (RGB signals, various luminance/chromaticity separated signals that are expressed by linear transformations of RGB signal, and CIE LAB signals, which signals may or may not be gamma-corrected) and vice versa.

While many kinds of color signals are available in the art, considering RGB signals, various luminance/chromaticity separated signals that are expressed by linear transformation of RGB signals and CIE LAB signals (all these signals may or may not be gamma-corrected) will sufficient for the proposes of the present invention, as discussed below.

First, it should be mentioned that the present inventors made reviews, from various standpoints, as to what color signals should be used over a network. The results of these reviews are summarized in Table 1.

TABLE 1

| | Device independence (Is color representation device independent?) | | Data compression (effects of bit dropouts and possibility of subsampling) | Renderability of all visible colors | | Color differences created by changes in the white reference | |
|---|---|---|---|---|---|---|---|
| XYZ | ○ | | Δ | Deterioration in low-value area; XZ subsampling possible | ○ | Only possible with positive values | ? |
| RGB (may be gamma-corrected) (CIE RGB, NTSC RGB, etc.) | ○ | Device independent if white reference/ three primaries (/gamma correction value) are given | Δ⁻ | Deterioration in low-value areas | ○ | Possible if negative values are used | ? |
| CMYK (dot percentage) | Δ | Value are inherent in devices (Neugebauer's equation is only applicable in limited cases) | Δ⁻ | Close to RGB (reflectance) | X | Impossible since only positive values are defined | ? |
| CIE LUV | ○ | Device independent if the white reference is given | ○ | Uniform in the effects of deterioration; UV subsampling possible | ○ | Possible if negative values are used for U*V* | Δ |
| CIE LAB | ○ | Device independent if the white reference is given | ○ | Uniform in the effects of deterioration; AB subsampling is possible | ○ | Possible if negative values are used for a*b* | ○⁻ Better than CIE LUV |
| Lum-Chr (may be gamma-corrected) (NTSC YIQ, etc.) | ○ | Can be determined from RGB by 3 × 3 matrix operations | ○⁻ | Less deterioration in chrominance; Chr subsampling is possible | ○ | Possible if negative values are used for chrominance | ? |
| RGB density | ○ | Can be obtained from RGB (reflectance) by logarithmic | Δ | Less deteriorated in low-value areas than RGB (reflectance) | X | Impossible since only the positive values of RGB (reflectance) are defined | ? |
| Polar (HSL, HSV, HSI, etc.) | ○ | Can be obtained from RGB (reflectance) by simple computing | X | Appreciable deterioration in low-value, high-saturation area | ○ | Possible if negative values are used | ? |

| | Ease of conversions to and from XYZ | | Compatibility with monochrome device | | Industrial application (standard or frequently used) | | Other features |
|---|---|---|---|---|---|---|---|
| XYZ | ○ | | ○ | Compatible if Y is used | Δ | (Fundamentals of colorimetry) | ○ Chromaticity diagram is convenient for additive mixing |
| RGB (may be gamma-corrected) (CIE RGB, NTSC RGB, etc.) | ○ Δ | Possible by 3 × 3 matrix operations (and gamma transformation) | Δ Δ⁻ | Can be converted Lum-Chr (and gamma transformation) by 3 × 3 matrix operations | ○ | Standard for television (NTSC RGB); Under review as the standard for CG (CGM RGB) | |
| CMYK (dot percentage) | X | Conversion from XYZ to CMYK is mathematically impossible | X | K for achromatic analysis would be chrominance | ○⁻ | Standard for graphic arts (DDES) | |
| CIE LUV | Δ⁻ | Raising to power ⅓, multiplication and division are necessary | ○ | Compatible if L is used | Δ | (Used with video monitors) | ○⁺ The fidelity color reproduction can be represented; convenient for gamut compression; chromaticity diagram is convenient for additive mixing |
| CIE LAB | Δ | 3 × 3 matrix operations and raising to power | ○ | Compatible if L is used | Δ | (Used in hard copies) | ○ The fidelity of color reproduction can be |

TABLE 1-continued

| | | | | | | |
|---|---|---|---|---|---|---|
| | ↕ are necessary | | | | | represented; convenient for garmut compression |
| Lum-Chr (may be gamma-corrected) (NTSC YIQ, etc.) | ○ △ | Possible by 3 × 3 matrix operations (and gamma transformation) | ○ | Compatible if Y is used | ○ | Standard for television (YIQ); Typically used for data compression (YCrCb) |
| RGB density | ○⁻ | Can be obtained from RGB (reflectance by logarithmic conversion | △ | Inverse logarithmic conversion and 3 × 3 matrix operations are necessary | △ | (Used in hard copies) |
| Polar (HSL, HSV, HSI, etc.) | ○⁻ | Can be obtained from RGB (referectance) by simple computing | △⁻ | Simple computing and 3 × 3 matrix operations are necessary | △ | (Used as UIF of CG) |

The individual parameters for evaluation listed in Table 1 are described below seriatim.

The importance of "device independence" is obvious if one considers the case where a device (sender) that outputs color signals to a network outputs its own color signals (internal formats of color representation) unaltered. If, in this case, M senders having M different internal color signals are connected to the network, each of the devices (receivers) that are connected to the network for receiving the color signals sent out from those senders must be equipped with M different color signal converters each of which is capable of converting the M different color signals to the internal color signals of the receiver and this puts great strain on the system. The situation may be better understood by referring to FIG. 11. Senders of color signals 300-1 to 300-M are connected to receivers 400-1 to 400-N, each of which must be equipped with associated signal converters 500-1 to 500-M. If another sender that has the (M+1)th internal color signal is connected to the network, all of the existing receivers need a color signal converter that converts the (M+1)th color signal to their own internal color signals. This is a indeed a very difficult situation to cope with. A more advantageous approach would be such that standard color signals that are independent of all the devices connected to the network are used and that the senders are equipped with means of converting their own internal color signals to those standards while, at the same, the receivers are also equipped with means of converting those standards to their won internal color signals. An example of this situation is shown in FIG. 12. Each of the senders 300-1 to 300-M is connected to converters 600-1 to 600-M, each converting the internal color signals of the senders to the standard signals. At the same time, each of the receivers 400-1 to 400-N is connected to converters 500-1 to 500-N, each converting those standard color signals to the internal color signals of the receivers. The advantage of this layout is that if an additional sender having the (M+1)th internal color signal is to be connected to the network, only the new sender need be equipped with a means of converting its own internal color signals to standards and there is no need for revamping the existing receivers. Needless to say, only one kind of standard color signals are desirably used over the network but no single kind can be determined uniquely since different kinds of standard color signals have their own merits and demerits as one can see from the following discussion of the other parameters for evaluation. It should, however, be remembered that correct accurate reproduction is impossible without correspondence to the CIE XYZ color model which has been specified by the Commission Internationale de l'Esclairage (CIE) as the basic system of colorimetry and, therefore, the relationships to the CIE XYZ color model must be defined clearly enough to permit reference to that model.

The importance of "data compression" is also obvious in view of the huge volume of information in color data, particularly in color raster data. Table 1 gives the results of a review made on how the quality of image perceivable by the human eye will change when the volume of information in color raster data is compressed in terms of both gradation levels (bits per pixel) and resolution (pixels per inch).

"Renderability of all visible colors" is important since in the presence of various senders connected to the network, it is at least necessary for the color signals used over the network to have the gamut of renderable colors that covers the entire range visible to the human eye.

"Color differences created by changes in the white reference" are important from the following viewpoint. Devices connected to the network represent "colors" in various environments and in order to reproduce the same color in those environments, the color signals used must be adaptive to the human eye's response to environmental variations. However, the appearance of colors in various environments (such whether the color is that of a self-luminous or a reflecting object, or the intensity of illumination) is one of the topics in color science that have not been fully unraveled and nothing can be said definitely about this. However, some research work has been done to evaluate "chromatic adaptation" which is a human response to changes in the color of illumination (white reference) on reflecting objects and the result of that work is cited in Table 1.

The "ease of conversions to and from XYZ" is important from the following viewpoint. As already mentioned in connection with "device independency', the color signals used over the network must be related to the CIE XYZ color model, so it would be necessary that every sender which outputs color signals other hand those in the CIE XYZ model also add the associated information (calibration data). Then, a receiver calculates CIE XYZ signals from the color signals on the network using the added calibration data and converts them to its own internal color signals (needless to say, the conversion may be accomplished in one step). Therefore, the ease of conversions to and from CIE XYZ signals is necessary for both senders and receivers.

"Compatibility with monochrome device" is important from the following viewpoint. Various monochrome devices are already connected to existing networks and it is highly likely that they continue to be an integral part of the network from now on for economic reasons. Hence, it is necessary to insure that color information received by those monochrome devices is reproduced as monochrome information without installing any additional devices.

"Industrial application" is important for the same reason as set forth in connection with "compatibility with monochrome device'. If various devices are to be connected to the network, the compatibility with them must be taken into account.

According to Table 1, one may conclude that XYZ, RGB, CIE LAB and luminance/chromaticity separated signals (including those which are gamma-corrected) are suitable for use over the network. At least at present, no single type of signals can be selected from among those since some parameters have not been thoroughly investigated and because the parameters for evaluations are yet to be reasonably weighted. The other color signals have the following drawbacks.

The problems of CMYK are that it is not a color model based on colorimetry but that CMYK color signals are essentially device dependent, that CMYK signals have been defined only by positive values and are not capable of rendering all visible colors, and that CMYK is incompatible with monochrome devices. The CIE LUV model is essentially a uniform color space and has as good characteristics as CIE LAB. However, CIE LUV experiences greater color differences in response to changes in the white reference than does CIE LAB and, in addition, it is not easy to convert CIE LAB to CIE LUV or vice versa. The (u', v') chromaticity diagram accompanying the CIE LUV model is convenient for additive mixing but to convert CIE LUV to u'v', a mathematical operation of division is necessary. The problem of RGB (density) is that it has been defined only in terms of positive values and hence it is not capable of rendering all visible colors. Color models such as HSL, HSV and HSI that are based on a polar coordinate system can potentially experience deterioration in low-lightness/high-saturation areas.

A special consideration need be made as regards the receivers of CMYK color signals which are already used in graphic arts. As already mentioned, the CMYK model is not based on colorimetry, so it is inherently impossible to expect accurate color reproduction with this color model. If a receiver is supplied with CMYK color signals, the following convenient method is to be adopted and the input CMYK signals will be ignored in subsequent steps:

1. Supply the printer with the values of CMYK signals unaltered;
2. Calculate $(1-C-K)$, $(1-M-K)$ and process them as if they were default RGB signals.

As will be understood from the foregoing discussion, if XYZ is taken to fall within the class of luminance/chromaticity separated signals, one may safely conclude that the color signals that need be considered in determining what should be subjected to conversions to and from other kinds of color signals are RGB signals, various luminance/chromaticity separated signals that are expressed by linear transformations of those RGB signals and CIE LAB signals, which signals may or may not be gamma-corrected.

The color signal converter of the present invention is shown schematically in FIG. 1 and comprises a first matrix computing means 01 that performs matrix operations on input color signals F1, F2 and F3, a gamma transforming means 02 by which the results of computation G1, G2 and G3 with the first matrix computing means 01 are gamma-transformed to G4, G5 and G6, respectively, a second matrix computing means 03 that performs matrix operations on G4, G5 and G6, and a rewriting means 04 that rewrites the coefficients of matrices in the computing means 01 and 03 and the constants used in the gamma transforming means 02.

As shown in FIG. 1, the operation of this color signal converter at the receiver end starts with computing input color signals F1, F2 and F3 by the first matrix computing means 01 to convert them to intermediate color signals G1, G2 and G3. If F1, F2 and F3 are CIE LAB signals, the matrix operations to be performed by the first matrix computing means 01 are those expressed by Eq. (2) and the resulting color signals G1, G2 and G3 are $f(X/X_0)$, $f(Y/Y_0)$ and $f(Z/Z_0)$. These signals G1, G2 and G3 are converted to X, Y and Z by the gamma transforming means 02. The coefficients of the matrices in the second matrix computing means 02 are each a unit matrix. If, in the next step, NTSC YIQ signals are entered as F1, F2 and F3, the rewriting means 04 performs its function and the coefficients of matrices in the first and second matrix computing means 01 and 03 are changed to the values represented by Eq. (3). At the same time, the constants to be used in the gamma transforming means 02 are rewritten to "1', and the coefficients for the matrix operations to be performed by the second matrix computing means 03 are rewritten in such a way that it will perform the operations expressed by:

$$X = 0.608Rn + 0.174Gn + 0.200Bn \quad (4)$$
$$Y = 0.299Rn + 0.587Gn + 0.114Bn$$
$$Z = \phantom{0.299Rn + {}} 0.0662Gn + 1.112Bn$$

In this way, various input color signals can be converted accurately merely by rewriting the associated coefficients and constants with the same circuit.

If, at the sender end, H1, H2 and H3 are CIE LAB signals, the matrix operations to be performed by the second matrix computing means 03 are those expressed by Eq. (2), and G4, G5 and G6 signals which are input to that matrix computing means are $f(X/X_0)$, $f(Y/Y_0)$ and $f(Z/Z_0)$. The constants to be used in the gamma transforming means 02 are set in such a way that it calculates $f(X/X_0)$, $f(Y/Y_0)$ and $f(Z/Z_0)$ from the outputs X, Y and Z of a signal generating means. The coefficients of the matrices in the first matrix computing means 01 are each a unit matrix.

If, in the next step, NTSC YIQ signals need to be output as H1, H2 and H3, the rewriting means 04 performs its function and the coefficients of the matrices in the second matrix computing means 03 are changed to the values represented by Eq. (3)'. At the same time, the constants to be used in the gamma transforming means 02 are rewritten to "1', and the coefficients for the matrix operations to be performed by the first matrix computing means 01 are rewritten in such a way that it will perform the operations expressed by:

$$Rn = 1.903X - 0.531Y - 0.288Z$$

$$Gn = -0.986X + 2.001Y - 0.0283Z$$

$$Bn = 0.0585X - 0.119Y + 0.901Z \quad (4)$$

In this way, accurate conversions to various output color signals can be accomplished merely by rewriting the associated coefficients and constants with the same circuit.

BRIEF DESCRIPTION OF THE DRAWINGS

In the accompanying drawings:

FIG. 5 is a block diagram showing a color signal editing apparatus equipped with a color signal converter according to a fourth embodiment of the present invention;

DESCRIPTION OF THE PREFERRED EMBODIMENTS

Various embodiments of the present invention are described below with reference to the accompanying drawings.

Figure 2:
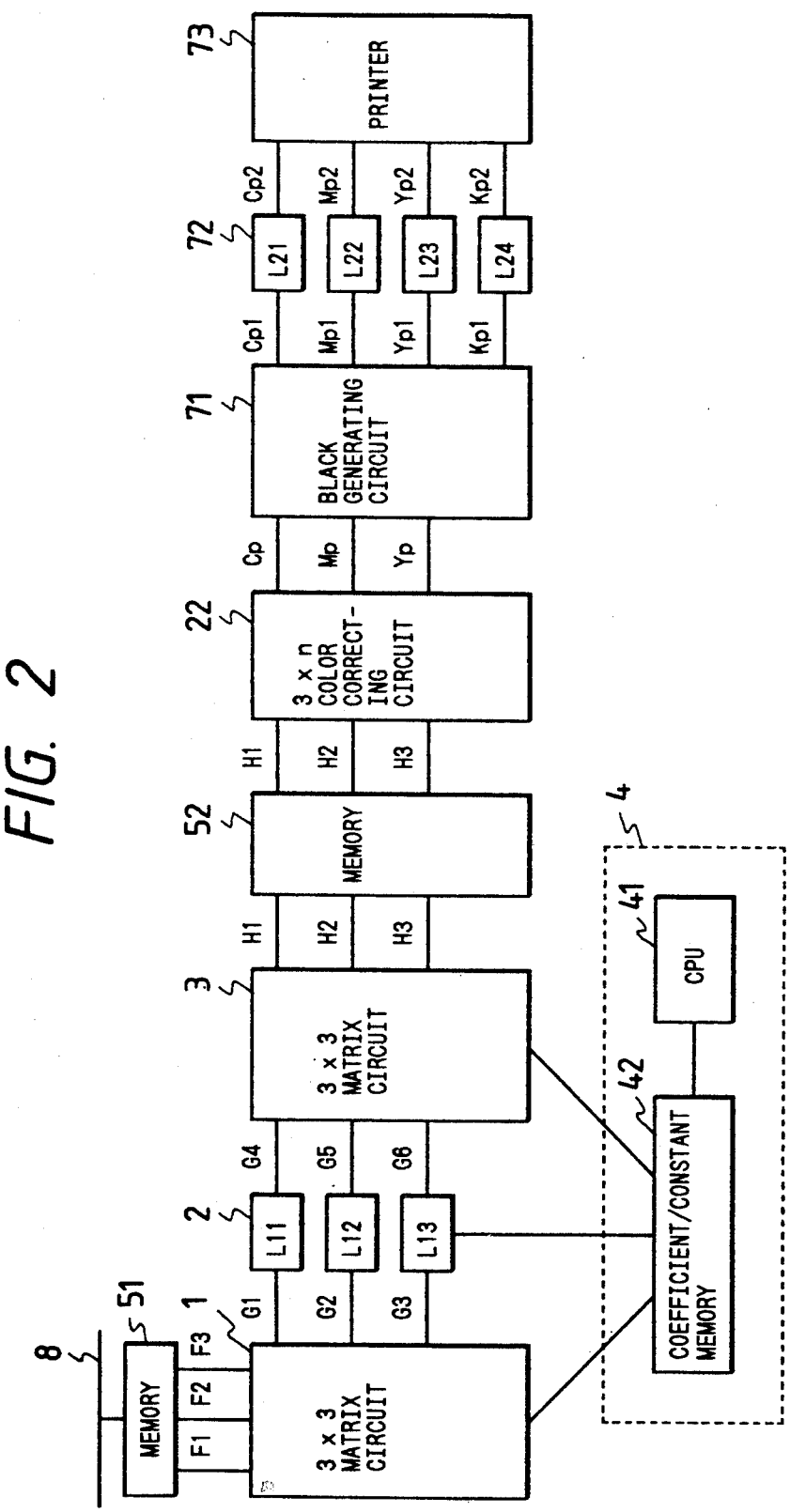
FIG. 2 is a block diagram showing a color recording apparatus equipped with a color signal converter according to a first embodiment of the present invention.

FIG. 2 is a block diagram showing a color recording apparatus equipped with a color signal converter according to a first embodiment of the present invention. As shown, the color recording apparatus is connected to a network 8. Shown by 51 and 52 are data memories. Shown by 1 is a 3×3 matrix computing circuit which performs matrix operations on input color signals F1, F2 and F3 to convert them to the first intermediate color signals G1, G2 and G3. Depending upon the types of specific color signals, the matrix coefficients in that computing circuit may be either the various delivered as calibration data, or the values stored in and read out of a coefficient memory 42, or the result of computation from those two kinds of values. These values are written in, read out and computed by a CPU 41.

Three one-dimensional LUTs indicated by 2 change the forms of curves in the first intermediate color signals G1, G2 and G3 to G4, G5 and G6, respectively. Depending upon the types of specific color signals, the values of G4, G5 and G6 may be either the values delivered as calibration data, or the values stored and read out of the coefficient memory 42, or the result of computation from those two kinds of values. These values are written in, read out and computed by the CPU 41.

A 3×3 matrix computing circuit indicated by 3 performs matrix operations on the second intermediate color signals G4, G5 and G6 and convert them to the third intermediate color signals H1, H2 and H3. Depending upon the types of specific color signals, the matrix coefficients in that computing circuit may be either the values delivered as calibration data, or the values stored in and read out of the coefficient memory 42, or the result of computation from those two kinds of values. These values are written in, read out and computed by the CPU 41.

A 3×n color correcting matrix circuit indicated by 22 calculates the amounts of inks Cp, Mp and Yp that are to be deposited on the recording sheet. The value of n is basically 3 but a circuit containing higher-order terms may be used if more accurate color reproduction is required. The coefficients for the matrix circuit 22 are read out of the coefficient memory 42 and written in by the CPU 41. Thereafter, a black generating circuit 71 performs conversion to four color signals Cp1, Mp1, Yp1 and Kp1 which is a signal for the amount of black ink. These signals are sent to four one-dimensional LUTs 72, where they are converted to signals Cp2, Mp2, Yp2 and Kp2 that are appropriate for the characteristics of a printer 73 and which thence are supplied to the printer 73 for printing on the recording sheet. What is characteristic of the embodiment under discussion is that the third intermediate color signals H1, H2 and H3 are always X, Y and Z. Hence, the coefficients that are preliminarily determined by regression in such a manner as to enable accurate color reproduction of X, Y and Z may suffice as coefficients to be used for calculating Cp, Mp and Yp in the color correcting circuit 22.

The following are basic examples of the specific coefficients and constants that are to be stored in the memory 42 in association with various types of color signals. Needless to say, those are not the sole examples that can be used in the present invention and other methods may be employed to optimize individual coefficients and constants for achieving accurate color reproductions.

When F1, F2 and F3 are CIE LAB color signals, the matrix operations to be performed by the computing circuit 1 are those expressed by Eq. (2), and the coefficients for those operations are stored in the memory 42. Then, the first intermediate color signals G1, G2 and G3 are $f(X/X_0)$, $f(Y/Y_0)$ dimensional LUTs indicated by 2, the values that perform conversions from $f(X/X_0)$, $f(Y/Y_0)$ and $f(Z/Z_0)$ to X, Y and Z are stored in the memory 42. Here, $X_0$, $Y_0$ and $Z_0$ take on standard values (i.e., $X_0 = 96.4$, $Y_0 = 100$ and $Z_0 = 82.4$ for D50). However, if different values $X_q$, $Y_q$ and $Z_q$ are sent as calibration data and if it is found that modifications with those values is advisable, CPU 41 changes the prestored values to those which perform conversions from $f(X/X_0)$, $f(Y/Y_0)$ and $f(Z/Z_0)$ to $(XX_q/X_0)$, $(YY_q/Y_0)$ and $(ZZ_q/Z_0)$ and the so changed values are written into the LUTs 2. In whichever case, the second intermediate color signals G4, G5 and G6 are X, Y and Z. Further, as is clear from Eq. (2), the exact formulas of $f(X/X_0)$, $f(Y/Y_0)$ and $f(Z/Z_0)$ will vary depending upon whether 0.008856 is exceeded or not, so there is a need to use different LUTs in two different cases. In fact, however, the values of $X/X_0$, $Y/Y_0$ and $Z/Z_0$ rarely become smaller than 0.008856, so in the example under consideration, the formulas for the case where each of $X/X_0$, $Y/Y_0$ and $Z/Z_0$ is greater than 0.008856 shall be used in all situations. Needless to say, different LUTs may be used depending upon whether those values exceed 0.008856. In the 3×3 matrix computing circuit 3, matrix operations are performed with their matrix coefficients being set as those of unit matrices, which accordingly are stored in the memory 42. Hence, the third intermediate color signals H1, H2 and H3 are X, Y and Z.

When yet to gamma-corrected NTSC YIQ signals are entered as F1, F2 and F3, the matrix operations to be performed by the computing circuit 1 are those expressed by Eq. (3) which perform conversion to NTSC RGB signals and the coefficients for those operations are stored in the memory 42. As for the constants for the three one-dimensional LUTs 2, a straight line with the gradient 1 that passes through the origin is stored in the memory 42. Hence, the second intermediate color signals G4, G5 and G6 are NTSC RGB signals. In the 3×3 matrix computing circuit 3, conversions from NTSC RGB to XYZ are performed as expressed by Eq. (4) and the associated coefficients are stored in the memory 42. Hence, the third intermediate color signals H1, H2 and H3 are X, Y and Z. The coefficients in the color correcting circuit 22 may take on the same values as described in connection with CIE LAB input signals. Alternatively, the following procedure may be taken. The computing circuit 1 is designed to perform matrix operations which are composite of the matrix operations for conversion to NTSC RGB as expressed by Eq. (3) and the matrix operations for conversion from NTSC RGB to XYZ as expressed by Eq. (4), and the associated matrix coefficients are stored in the memory 42. As for the constants for the three one-dimensional LUTs 2, a straight line with the gradient 1 that passes through the origin is stored in the memory 42. Hence, the second intermediate color signals G4, G5 and G6 are X, Y and Z. The 3×3 matrix computing circuit 3 indicated by 3 performs unit matrix operations, so the associated coefficients are stored in the memory 42. The third intermediate color signals H1, H2 and H3 are X, Y and Z. The coefficients in the color correcting circuit 22 take on the same values as described in connection with CIE LAB input signals. If the coefficients of a composite matrix which is the combination of the matrix that converts NTSC YIQ signals to NTSC RGB signals with the matrix that converts NTSC RGB signals to XYZ signals are sent as calibration data and if it is found that the values of those coefficients are preferably used, they are accordingly used to perform matrix operations in the computing circuit 1.

When other signals such as the white reference and yet to be gamma-corrected luminance/chromaticity separated signals having the three primary colors are entered as F1, F2 and F3, the matrix operations to be performed by the computing circuit 1 are those which convert those signals to XYZ signals and the values sent as calibration data are used as the associated matrix coefficients. If no calibration data is sent, processing in this example is performed on the assumption that NTSC YIUQ signals were entered. Thus, in the example under consideration, the default is NTSC YIQ signals. Needless to say, the default may be other signals. The constants for the three one-dimensional LUTs 2 and the coefficients in the 3×3 matrix computing circuit 3 take on the same values as those described in connection with yet to be gamma-corrected NTSC YIQ signals.

When yet to be gamma-corrected NTSC RGB signals are entered as F1, F2 and F3, the computing circuit 1 performs unit matrix operations and the associated coefficients are stored in the memory 42. As for the constants for the three one-dimensional LUTs 2, a straight line with the gradient 1 that passes through the origin is stored in the memory 42. Hence, the second intermediate color signals G4, G5, and G6 are NTSC RGB signals. In the 3×3 matrix computing circuit indicated by 3, conversions from NTSC RGB to XYZ are performed and the associated coefficients are stored in the memory 42. Hence, the third intermediate color signals H1, H2 and H3 are X, Y and Z. The coefficients in the color correcting circuit 22 may take on the same values as described in connection with CIE LAB signals. Alternatively, the following procedure may be taken. The computing circuit 1 is designed to perform matrix operations for NTSC RGB to XYZ conversion and the associated coefficients are stored in the memory 42. As for the constants for the three one-dimensional LUTs 2, a straight line with the gradient 1 that passes through the origin is stored in the memory 42. Hence, the second intermediate color signals G4, G5, and G6 are Y, Y and Z. In the 3×3 matrix computing circuit 3, unit matrix operations are performed and the associated coefficients are stored in the memory 42. The third intermediate color signals H1, H2 and H3 are X, Y and Z. The coefficients in the color correcting circuit 22 take on the same values as described in connection with CIE LAB signals. If the coefficients of matrix operations that performs NTSC RGB to XYZ conversion are sent as calibration data and if it is found that the value of those coefficients are preferably used, they are accordingly used to perform matrix operations in the computing circuit 1.

When other signals such as the white reference and yet to be gamma-corrected RGB signals having the three primary colors are entered as F1, F2 and F3, the computing circuit 1 performs matrix operations for converting those input signals to XYZ signals and the values sent as calibration data are used the associated matrix coefficients. If no calibration data is sent, processing is performed in this example on the assumption that NTSC RGB signals were entered. Thus, in the example under consideration, the default is NTSC RGB signals. Needless to say, the default may be other signals. The constants for the three one-dimensional LUTs and the coefficients in the 3×3 matrix computing circuit 3 take on the same values as those described in connection with yet to be gamma-corrected NTSC RGB signals.

When gamma-corrected NTSC YIQ signals are entered as F1, F2 and F3, values (raising to power of 2.2) that convert gamma-corrected NTSC RGB signals to yet to be gamma-corrected NTSC RGB signals are stored in the memory 42 as the coefficients for the three one-dimensional LUTs 2. However, if a gamma-correcting table is sent as calibration data and if it is found preferable to use values in that table, the prestored values are changed to those values and written into the LUTs 2. The values to be used in the other calculations are the same as those described in connection with yet to be gamma-corrected NTSC YIQ signals.

When other signals such as the white reference and gamma-corrected luminance/chromaticity separated signals having the three primary colors are entered as F1, F2 and F3, the computing circuit 1 performs matrix operations for converting those signals to gamma-corrected RGB signals and the values sent as calibration data are used as the associated matrix coefficients. Calibration data for performing conversion from gamma-corrected RGB signals to yet to be gamma-corrected RGB signals is used as the coefficients for the three one-dimensional LUTs 2. The $3 \times 3$ matrix computing circuit 3 uses calibration data for converting yet to be gamma-corrected RGB signals to X, Y and Z. If no calibration data is sent, processing is performed on the assumption that gamma-corrected NTSC YIQ signals were entered.

When gamma-corrected NTSC RGB signals are entered as F1, F2 and F3, values (raising to power of 2.2) that convert gamma-corrected NTSC RGB signals to yet to be gamma-corrected NtSC RGB signals are stored in the memory 42 as the coefficients for the three one-dimensional LUTs 2. The values to be used in the other calculations are the same as those described in connection with yet to be gamma-corrected NTSC RGB signals.

When other signals such as the white reference and gamma-corrected RGB signals having the three primary colors are entered as F1, F2 and F3, the computing circuit 1 performs matrix operations for converting those signals to yet to be gamma-corrected RGB signals and the values sent as calibration data are used as the associated matrix coefficients. Calibration data for performing conversion from gamma-corrected RGB signals to yet to be gamma-corrected RGB signals is used as the coefficients for the three one-dimensional LUTs 2. The $3 \times 3$ matrix computing circuit 3 uses calibration data for converting yet to be gamma-corrected RGB signals to X, Y and Z. If no calibration data is sent, processing is performed on the assumption that gamma-corrected NTSC RGB signals were entered.

Figure 1:
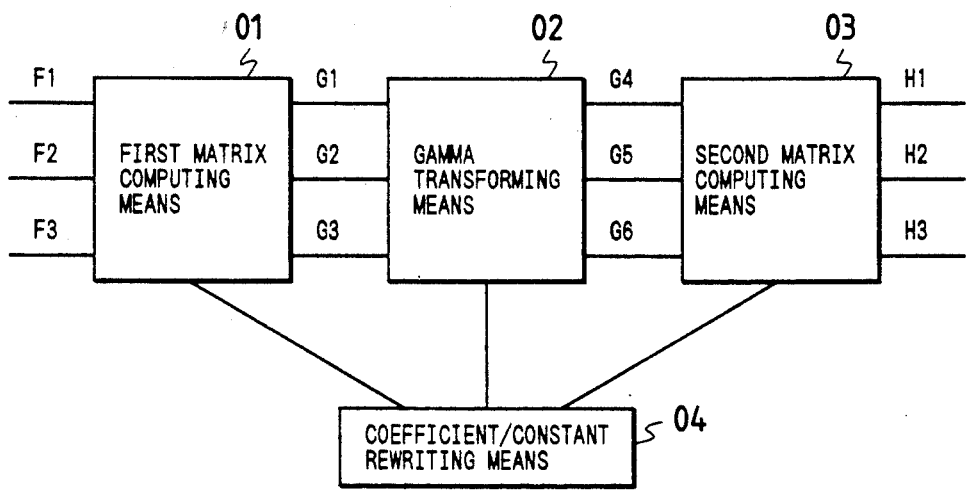
FIG. 1 is a schematic diagram showing the basic layout of the color signal converter of the present invention.
Figure 3:
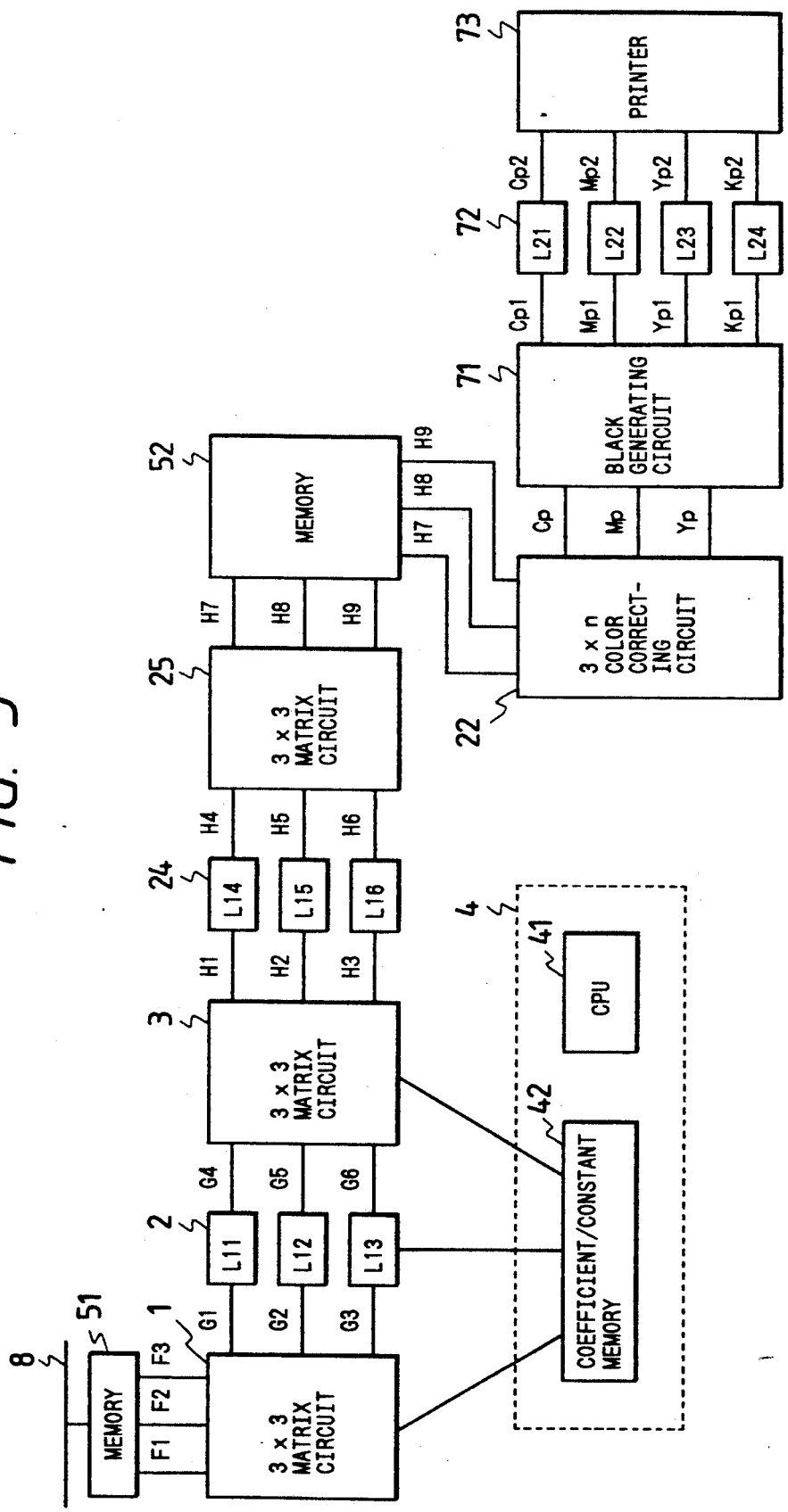
FIG. 3 is a block diagram showing a color recording apparatus equipped with a color signal converter according to a second embodiment of the present invention.

FIG. 3 is a block diagram showing a color recording apparatus equipped with a color signal converter according to a second embodiment of the present invention. Except for three one-dimensional LUTs indicated by 24 and a $3 \times 3$ matrix computing circuit indicated by 25, the color recording apparatus shown in FIG. 3 is identical to that of the first embodiment shown in FIG. 1 and, hence, the third intermediate color signals H1, H2 and H3 are always X, Y and Z. What is characteristic of the embodiment under discussion is that the fifth intermediate color signals H7, H8 and H9 are always CIE LAB signals. With this feature, high data compression is achievable as noted in Table 1, making it possible to reduce the capacity of the memory 52.

To implement this second embodiment, the values that perform conversions from X, Y and Z to $f(X/X_0)$, $f(Y/Y_0)$ and $f(Z/Z_0)$ are stored in the memory 42. Then, the fourth intermediate color signals H4, H5 and H6 are $f(X/X_0)$, $f(Y/Y_0)$ and $f(Z/Z_0)$. Here, $X_0$, $Y_0$ and $Z_0$ take on standard values (i.e., $X_0=96.4$, $Y_0=100$ and $Z_0=82.4$ for D50). The $3 \times 3$ matrix computing circuit 25 performs matrix operations with the associated matrix coefficients being set at the values expressed by Eq. (2). Those coefficients are stored in the memory 42. Hence, the fifth intermediate color signals H7, H8 and H9 are CIE LAB signals. The other coefficients and constants to be stored in the memory 42 are the same as those described in connection with the first embodiment.

In the two embodiments described above, the color correcting circuit 22 calculates the amounts of inks Cp, Mp and Yp that are to be printed on the recording sheet. This circuit may be composed of three-dimensional LUT or some other suitable computing circuits. Alternatively, the circuit may be composed of a three-input four-output LUT made integral with the black generating circuit 71.

Figure 4:
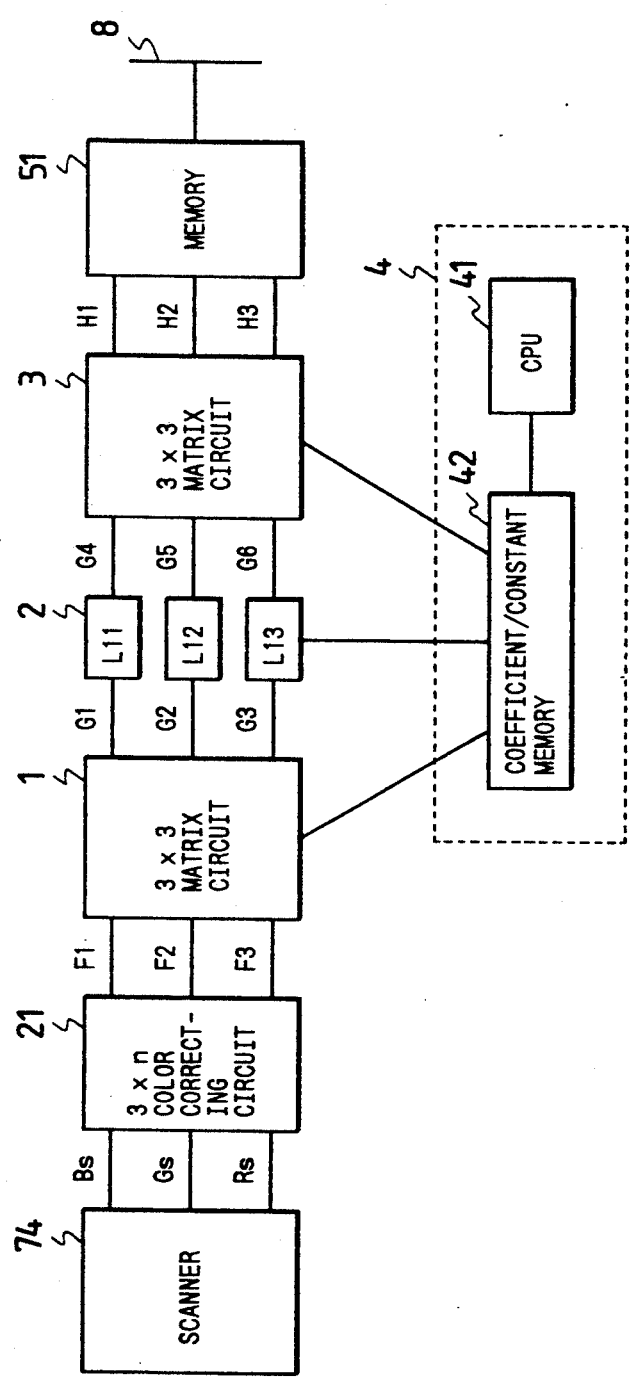
FIG. 4 is a block diagram showing a color signal outputting apparatus equipped with a color signal converter according to a third embodiment of the present invention.

FIG. 4 is a block diagram showing a color signal outputting apparatus equipped with a color signal converter according to a third embodiment of the present invention. Shown by 51 is a data memory.

Shown by 21 is a $3 \times n$ color correcting matrix circuit, where the outputs Bs, Gs and Rs of a color signal generating means are subjected to matrix operations for conversion to the first intermediate color signals F1, F2 and F3. The value of n is assumed to be 3 in the embodiment under discussion but if more accurate color reproduction is required, the circuit 21 may contain higher-order terms and/or three one-dimensional LUTs that change the forms of curves in color signals. Alternatively, the circuit may be composite with the $3 \times 3$ matrix computing circuit indicated by 1. In the embodiment under discussion, the first intermediate color signals F1, F2 and F3 are always X, Y and Z, so the coefficients that are preliminarily determined by regression in such a way as to enable accurate conversion to X, Y and Z may suffice as coefficients to be used in the color correcting circuit 21. If they are not determined preliminarily by regression, the coefficients for the circuit 21 are read out of the memory 42 by the CPU 41 in association with the specific types of color signals H1, H2 and H3 and are accordingly written into the circuit 21.

The $3 \times 3$ matrix computing circuit 1 performs matrix operation on the first intermediate color signals F1, F2 and F3 and converts then to the second intermediate color signals G1, G2 and G3. In association with the specific types of color signals H1, H2 and H3, values stored in the memory 42 are read out and used as the matrix coefficients for that computing circuit 1. Those values are written in, read out and computed by the CPU 41.

The three one-dimensional LUTs 2 change the forms of curves in the second intermediate color signals G1, G2 and G3 to G4, G5 and G6, respectively. Again, values stored in the memory 42 are read out and used as the values of G1, G2 and G3 in association with the specific types of color signals H1, H2 and H3. Those values re written in, read out and computed by the CPU 41.

Finally, the $3 \times 3$ matrix computing circuit 3 performs matrix operations on G4, G5 and G6 and converts them to color signals H1, H2 and H3 of various kinds. Values stored in the memory 42 are read out and used as the matrix coefficients for that computing circuit. Those values are written in, read out and computed by the CPU 41.

The following are basic examples of the specific coefficients and constants that are to be stored in the memory 42 in association with various types of color signals. Needless to say, those are not the sole examples that can be used in the present invention and other methods may be employed to optimize individual coefficients and constants for achieving accurate color reproductions.

When H1, H2 and H3 are CIE LAB color signals, the 3×3 matrix computing circuit 1 performs matrix operations with their matrix coefficients being set as those of unit matrices, which accordingly are stored in the memory 42. Hence, the second intermediate color signals G1, G2 and G3 are X, Y and Z. As for the constants for the three one-dimensional LUTs indicated by 2, the values that perform conversions from X, Y and Z to $f(X/X_0)$, $F(Y/Y_0)$ and $f(Z/Z_0)$ are stored in the memory 42. Hence, the third intermediate color signals G4, G5 and G6 are $f(X/X_0)$, $F(Y/Y_0)$ and $f(Z/Z_0)$ Here, $X_0$, $Y_0$ and $Z_0$ take on standard values (i.e., $X_0=96.4$, $Y_0=100$ and $Z_0=82.4$ for D50). However, if it is desirable to use different values Xq, Yq and Zq, conversions are made using those values and the resulting Xq, Yq and Zq are added as calibration data. Further, as is clear from Eq. (2), the exact formulas of $f(X/X_0)$, $F(Y/Y_0)$ and $f(Z/Z_0)$ will vary depending upon whether 0.008856 is exceeded or not, so there is a need to use different LUTs in two different cases. In fact, however, the values of $X/X_0$, $Y/Y_0$ and $Z/Z_0$ rarely become smaller than 0.008856, so in the example under consideration, the formulas for the case where each of $X/X_0$, $Y/Y_0$ and $Z/Z_0$ is greater than 0.008856 shall be used in all situations. Needless to say, different LUTs may be used depending upon whether those values exceed 0.008856. In the 3×3 matrix computing circuit 3, matrix operations are performed with their matrix coefficients being set as those expressed by Eq. (2), which accordingly are stored in the memory 42.

When yet to gamma-corrected NTSC YIQ signals are outputted as H1, H2 and H3, the 3×3 matrix computing circuit 1 performs matrix operations for conversion from X, Y and Z to NTSC RGB signals and the associated matrix coefficients are stored in the memory 42. Hence, the second intermediate color signals G1, G2 and G3 are NTSC RGB signals. As for the constants for the three one-dimensional LUTs 2, a straight line with the gradient 1 that passes through the origin is stored in the memory 42. Hence, the third intermediate color signals G4, G5 and G6, are also NTSC RGB signals. In the 3×3 matrix computing circuit 3, conversions from NTSC RGB to NTSC YIQ are performed, so conversion matrix coefficients expressed by Eq. (3)' are stored in the memory 42. Alternatively, the following procedure may be taken, the 3×3 matrix computing circuit 1 is capable of performing unit matrix operations, so the associated coefficients are stored in the memory 42. As for the constants for the three one-dimensional LUTs 2, a straight line with the gradient 1 that passes through the origin is stored in the memory 42. Hence, not only the second intermediate colors signals G1, G2 and G3 but also the third intermediate color signals G4, G5 and G6 are X, Y and Z. In the 3×3 matrix computing circuit 3, a composite matrix operation which is the combination of the matrix operations for conversion from X, Y and Z to NTSC RGB with the matrix operations for conversion from NTSC RGB to NTSC YIQ is performed and the associated matrix coefficients are stored in the memory 42.

When other signals such as a yet to be gamma-corrected white reference and luminance/chromaticity separated signals having the three primary colors are outputted as H1, H2 and H3, the 3×3 matrix computing circuit 1 performs unit matrix operations, so the associated coefficients are stored in the memory 42. As for the constants for the three one-dimensional LUTs 2, a straight line with the gradient 1 that passes through the origin is stored in the memory 42. Hence, not only the second color signals G1, G2 and G3 but also the third intermediate color signals G4, G5 and G6 are X, Y and Z. In the 3×3 matrix computing circuit 3, matrix operations are performed for converting X, Y and Z to output RGB signals, and the associated matrix coefficients are stored in the memory 42. These matrix coefficients are sent as calibration data.

When yet to be gamma-corrected NTSC RGB signals are outputted as H1, H2 and H3, the 3×3 matrix computing circuit 1 performs matrix operations for conversion from X, Y and Z to NTSC RGB, so the associated matrix coefficients re store din the memory 42. Hence, the second intermediate color signals G1, G2 and G3 are NTSC RGB signals. As for the constants for the three one-dimensional LUTs 2, a straight line with the gradient 1 that passes through the origin is stored in the memory 42. Hence, the third intermediate color signals G4, G5, and G6 are also NTSC RGB signals. The 3×3 matrix computing circuit 3 performs unit matrix operations. Alternatively, the following procedure may be taken. The 3×3 matrix computing circuit 1 performs unit matrix operations and the associated coefficients are stored in the memory 42. As for the constants for the three one-dimensional LUTs 2, a straight line with the gradient 1 that passes through the origin is stored in the memory 42. Hence, not only the second intermediate color signals G1, G2 and G3 but also the third intermediate color signals G4, G5 and G6 are X, Y and Z. The 3×3 matrix computing circuit 3 performs matrix operations for conversion from X, Y and Z to NTSC RGB signals and the associated matrix coefficients are stored in the memory 42.

When other signals such as a yet to be gamma corrected white reference and RGB signals having the three primary colors are outputted as H1, H2 and H3, the 3×3 matrix computing circuit 1 performs unit matrix operations, so the associated coefficients are stored in the memory 42. As for the constant for the three one-dimensional LUTs, a straight line with the gradient 1 that passes through the origin is stored in the memory 42. Hence, not only the second intermediate color signals G1, G2 and G3 but also the third intermediate color signals G4, G5 and G6 are X, Y and Z. The 3×3 matrix computing circuit 3 performs matrix operations for converting X, Y and Z to output RGB signals, and the associated matrix coefficients are stored in the memory 42. These matrix coefficients are sent as calibration data.

When gamma-corrected signals (i.e., NTSC YIQ and various other luminance/chromaticity separated signals, as well as NTSC RGB and various other RGB signals) are outputted as H1, H2 and H3, gamma-correcting values (raising to power of 1/2.2) are stored as the constants for the three one-dimensional LUTs 2. If necessary, those gamma-correcting values may be sent as calibration data. The values to be used in the other calculations are the same as those described in connection with yet to be gamma-corrected signals.

In the third embodiment, too, the color correcting circuit 21 is shown as a 3×3 color correcting matrix circuit but it may be composed of a three-dimensional LUT or some other suitable circuits.

FIG. 5 is a block diagram showing a color signal editing apparatus equipped with a color signal converter according to a fourth embodiment of the present invention. The color signal editing apparatus receives various kinds of the color signals, converts them to its own internal color signals for performing edit processes, and reconverts them to various kinds of color signals to be sent out. What is characteristic of the color signal converter of the embodiment under consideration is that color signal conversions in receiving and sending modes are implemented with the same circuit. If necessary, in order to reduce the capacity of the memory 52, a circuit for performing conversion to CIE LAB signals may be added as described in connection with the second embodiment.

Shown by 1 is a 3×3 matrix circuit. In a signal receiving mode, the circuit 1 performs matrix operations on input color signals F1, F2 and F3 and converts them to intermediate color signals G1, G2 and G3 and, in a signal sending mode, the circuit 1 converts intermediate color signals G4, G5 and G6 to output color signals H1, H2 and H3. Values stored in the coefficient memory 42 are read out and used as G1, G2 and G3 or as G4, G5 and G6 in association with the specific types of color signals F1, F2 and F3 or H1, H2 or H3. Those values are written in, read out and computed by the CPU 41.

The three one-dimensional LUTs 2 change the forms of curves in the intermediate color signals to G4, G5 and G5, respectively. Values stored in the coefficient memory 42 are also read out and used as G4, G5 and G6 in association with the specific types of color signals F1, F2 and F3 or H1, H2 or H3. Those values re written in, read out and computed by the CPU 41.

In a signal receiving mode, the 3×3 matrix computing circuit 3 performs matrix operations on intermediate color signals G4, G5 and G6 and converts them to intermediate color signals H2, H2 and H3 and, in a signal sending mode, the circuit 3 performs matrix operations on intermediate color signals F1, F2 and F3 and converts them to intermediate color signals G1, G2 and G3. Values stored in the coefficient memory 42 are read out and used as the matrix coefficients for the computing circuit 3 in association with the specific types of color signals F1, F2 and F3 or H1, H2 or H3. Those values are written in, read out and computed by the CPU 41.

In a signal receiving mode, a 3× n matrix color correcting circuit indicated by 84 performs matrix operations on intermediate color signals H1, H2 and H3 and converts them to its own internal color signals Bw, G2 and Rw and, in a signal sending mode, the circuit 84 performs matrix operations on its own internal color signals Bw, Gw and Rw and converts them to intermediate color signals F1, F2 and F3. The value of n is assumed to be 3 in the embodiment under discussion but if more accurate color reproduction is required, the circuit 84 may contain higher-order terms and/or three one-dimensional LUTs that change the forms of curves in color signals. In this embodiment, intermediate color signals H1, H2 and H3 (or F1, F2 and F3) are always X, Y and Z, so only two kinds of coefficients that are preliminarily determined by regression in such a way as to enable accurate conversions from the internal color signals Bw, Gw and Rw of the color correcting circuit 84 to X, Y and Z and vice versa will suffice as coefficients to be used in that circuit 84 and they may be selectively used depending upon whether the mode is signal receiving or sending. If the circuit 84 is configured in the way described in connection with the second embodiment, only two kinds of coefficients that are preliminarily determined by regression in such a way as to enable accurate conversions from CIE LAB signals to Bw, Gw and Rw and vice versa will suffice and they may be selectively used depending upon whether the mode is signal receiving or sending. In the above description of the fourth embodiment, the color correcting circuit 84 is shown as a 3 × n color correcting matrix circuit but it may be composed of a three-dimensional LUT or some other suitable circuits.

As regards the specific coefficients and constants that are to be stored in the memory 42 in association with various types of color signals, discussions have already been made in connection with the first and third embodiments and need to be repeated here.

Figure 6:
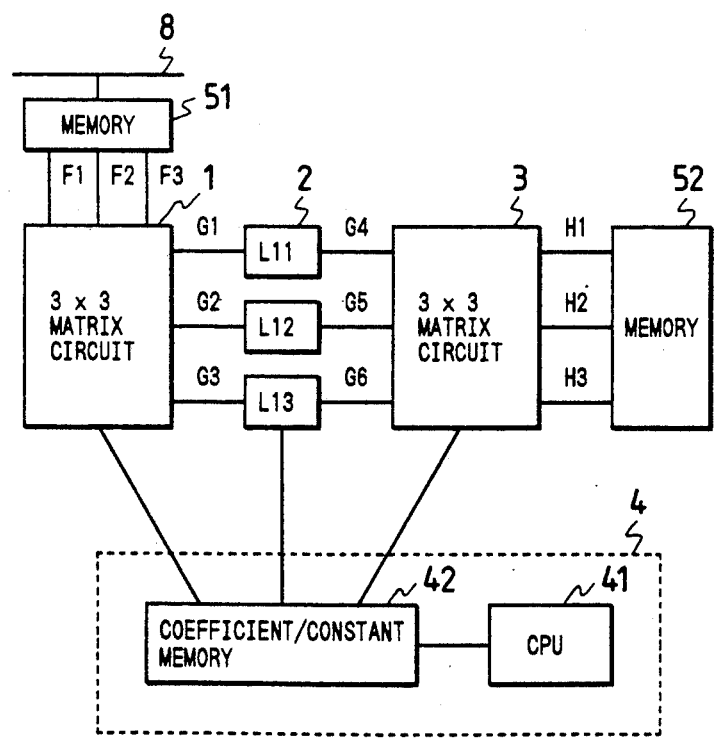
FIG. 6 is a block diagram showing a color signal storage apparatus equipped with a color signal converter according to a fifth embodiment of the present invention.

FIG. 6 is a block diagram showing a color signal storage apparatus equipped with a color signal converter according to a fifth embodiment of the present invention. The color signal storage apparatus receives various kinds of the color signals, converts them to its own internal color signals for storage, and reconverts them to various kinds of color signals to be sent out. What is characteristic of the color signal converter of the embodiment under consideration is that color signal conversions in receiving and sending modes are implemented with the same circuit. If necessary, in order to reduce the capacity of the memory 52, a circuit for performing conversion to CIE LAB signals may be added as described in connection with the second embodiment.

Shown by 1 is a 3×3 matrix circuit. In a signal receiving mode, the circuit 1 performs matrix operations on input color signals F1, F2 and F3 and converts them to intermediate color signals G1, G2 and G3 and, in a signal sending mode, the circuit 1 converts intermediate color signals G4, G5 and G6 to output color signals H1, H2 and H3. Values stored in the coefficient memory 42 are read out and used as G1, G2 and G3 or as G4, G5 and G6 in association with the specific types of color signals F1, F2 and F3 or H1, H2 or H3. Those values are written in, read out and computed by the CPU 41.

The three one-dimensional LUTs 2 change the forms of curves in the intermediate color signals to G4, G5 and G6, respectively. Values stored in the coefficient memory 42 are also read out and used as G4, G5 and G6 in association with the specific types of color signals F1, F2 and F3 or H1, H2 or H3. Those values re written in, read out and computed by the CPU 41.

In a signal receiving mode, the 3×3 matrix computing circuit 3 performs matrix operations on intermediate color signals G4, G5 and G6 and converts them to intermediate color signals H1, H2 and H3 and, in a signal sending mode, the circuit 3 performs matrix operations on intermediate color signals F1, F2 and F3 and converts them to intermediate color signals G1, G2 and G3. Values stored in the coefficient memory 42 are read out and used as the matrix coefficients for the computing circuit 3 in association with the specific types of color signals F1, F2 and F3 or H1, H2 or H3. Those values are written in, read out and computed by the CPU 41.

As regards the specific coefficients and constants that are to be stored in the memory 42 in association with various types of color signals, discussions have already been made in connection with the first and third embodiments and need to be repeated here.

Figure 7:
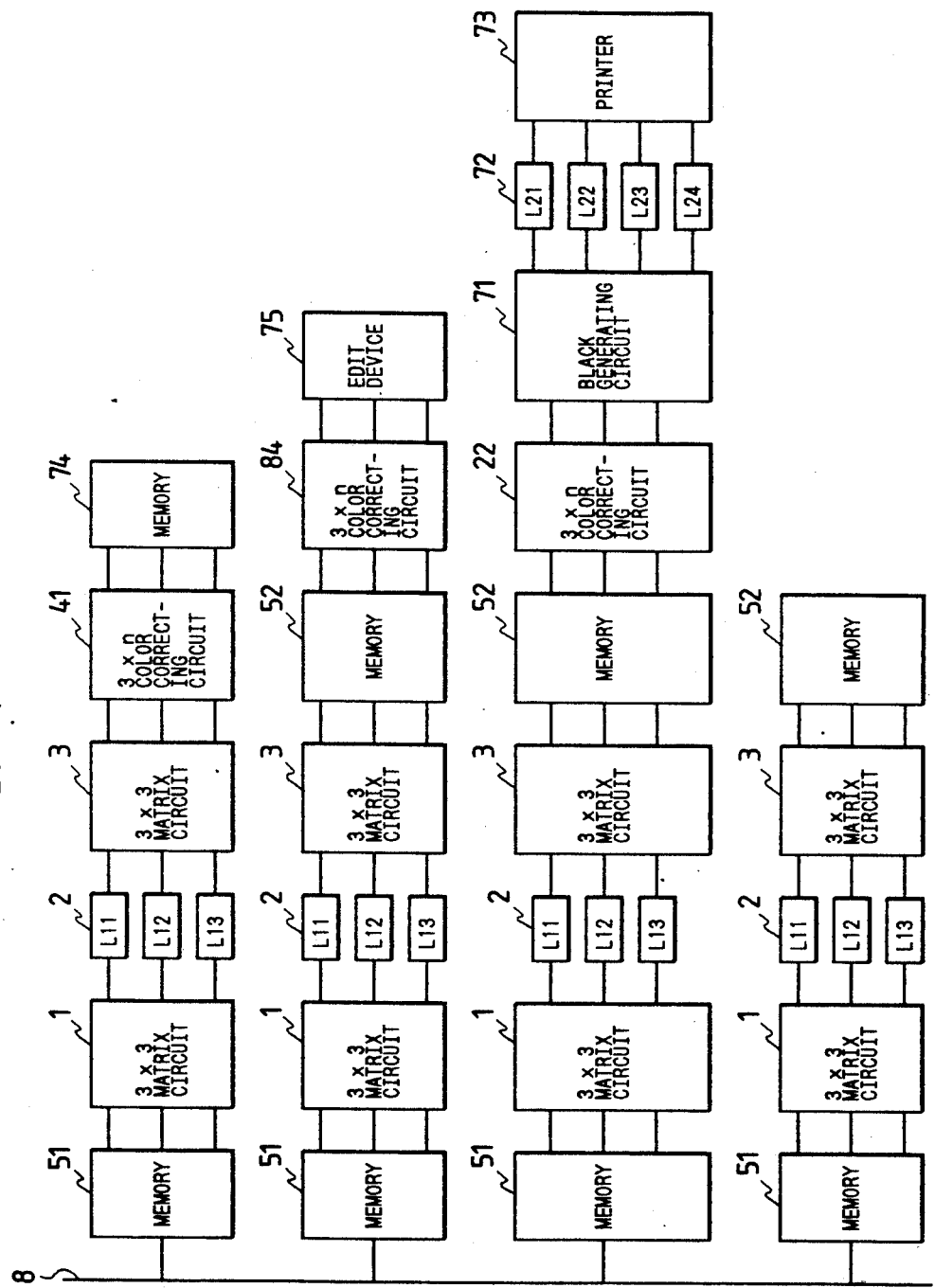
FIG. 7 is a block diagram showing a color network system equipped with a color signal converter according to a sixth embodiment of the present invention.

FIG. 7 is a block diagram showing a color network system equipped with color signal converters, except coefficient memories and CPUs, according to a sixth embodiment of the present invention. The color network system comprises a color signal outputting apparatus capable of sending out various kinds of color signals, a color signal storage apparatus capable of receiving and sending out various kinds of color signals, a color signal editing apparatus capable of receiving various kinds of color signals, editing them and reconverting the processed signals to various color signals to be sent out, and a color recording apparatus capable of receiving various kinds of color signals. Even if input/output devices and editing devices that are capable of handling only one kind of color signals are connected to this network system, color documents can be prepared by using those devices together with the apparatus described above. As a further advantage, the circuit of the color signal converter used in the system under consideration in the same whether it is incorporated into the color signal outputting apparatus, color signal storage apparatus, color signal editing apparatus and the color recording apparatus, and this offers a substantial economic advantage. The basic circuit configuration of the color signal converters used in the embodiment under discussion is the same as in the first embodiment but it may be based on the circuit shown in the second embodiment.

As regards the specific coefficients and constants that are to be stored in the coefficient memories in association with various types of color signals, discussions have already been made in connection with the first and third embodiments and need not be repeated here.

Figure 8:
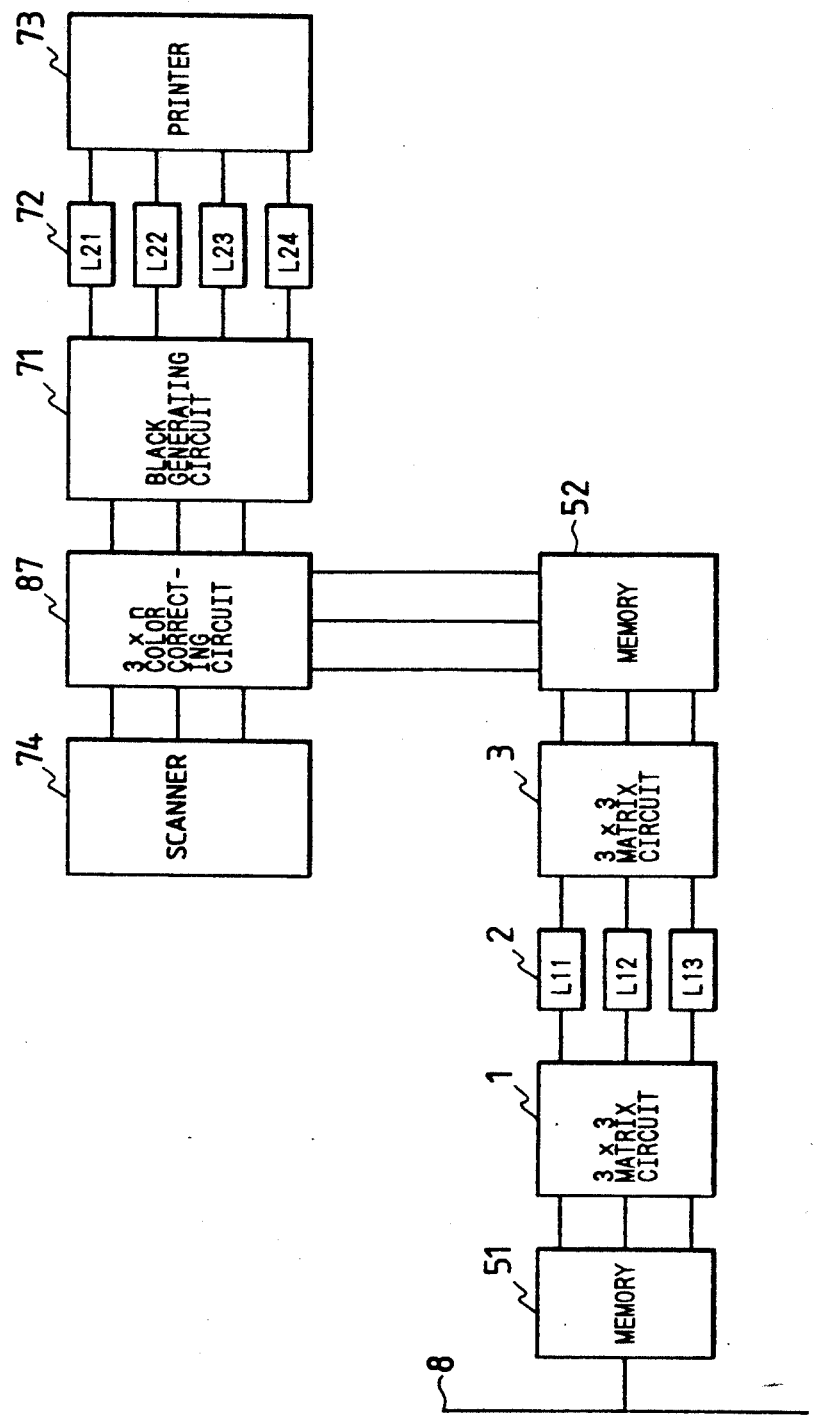
FIG. 8 is a block diagram showing a color copier equipped with a color signal converter according to a seventh embodiment of the present invention.
Figure 9:
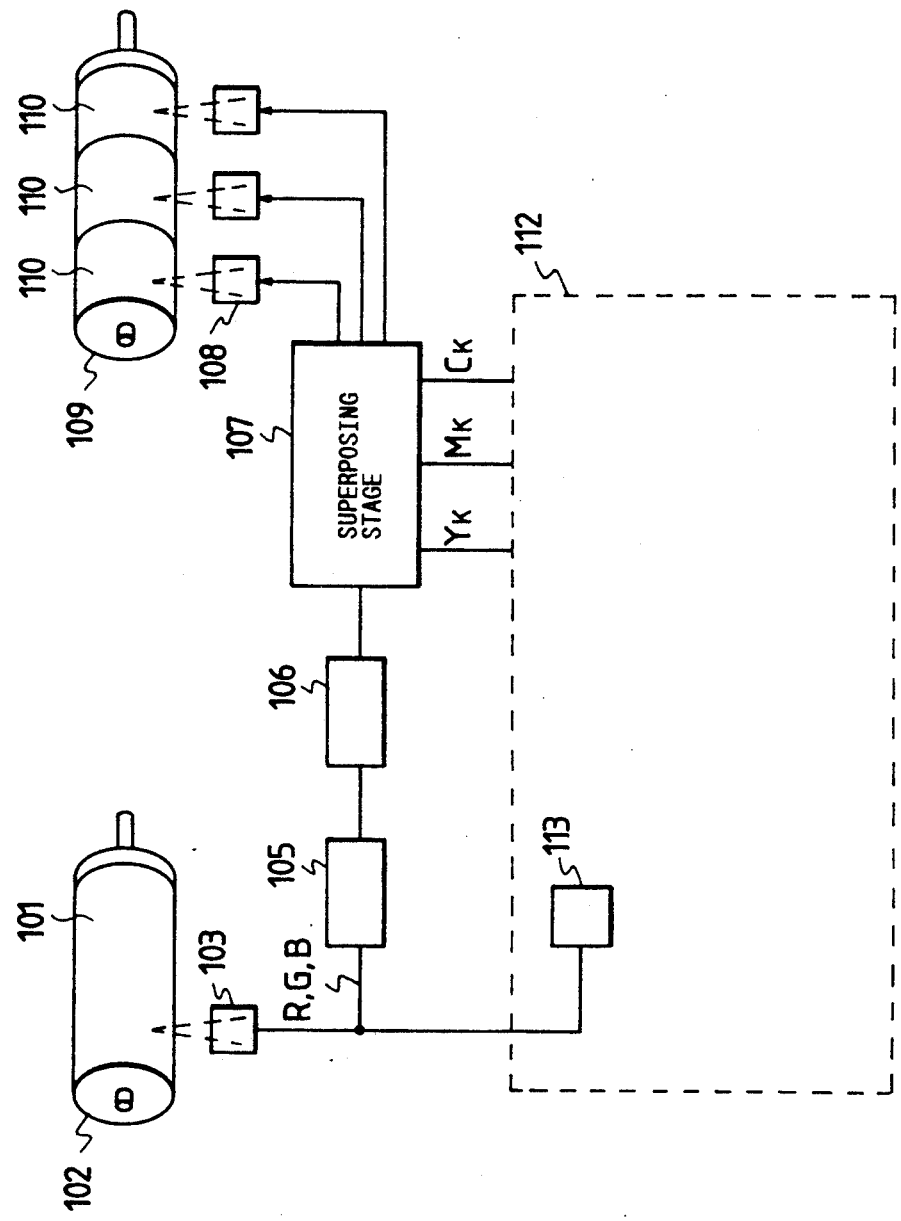
FIG. 9 is a block diagram of a color signal outputting apparatus equipped with a prior art color signal converter.
Figure 10:
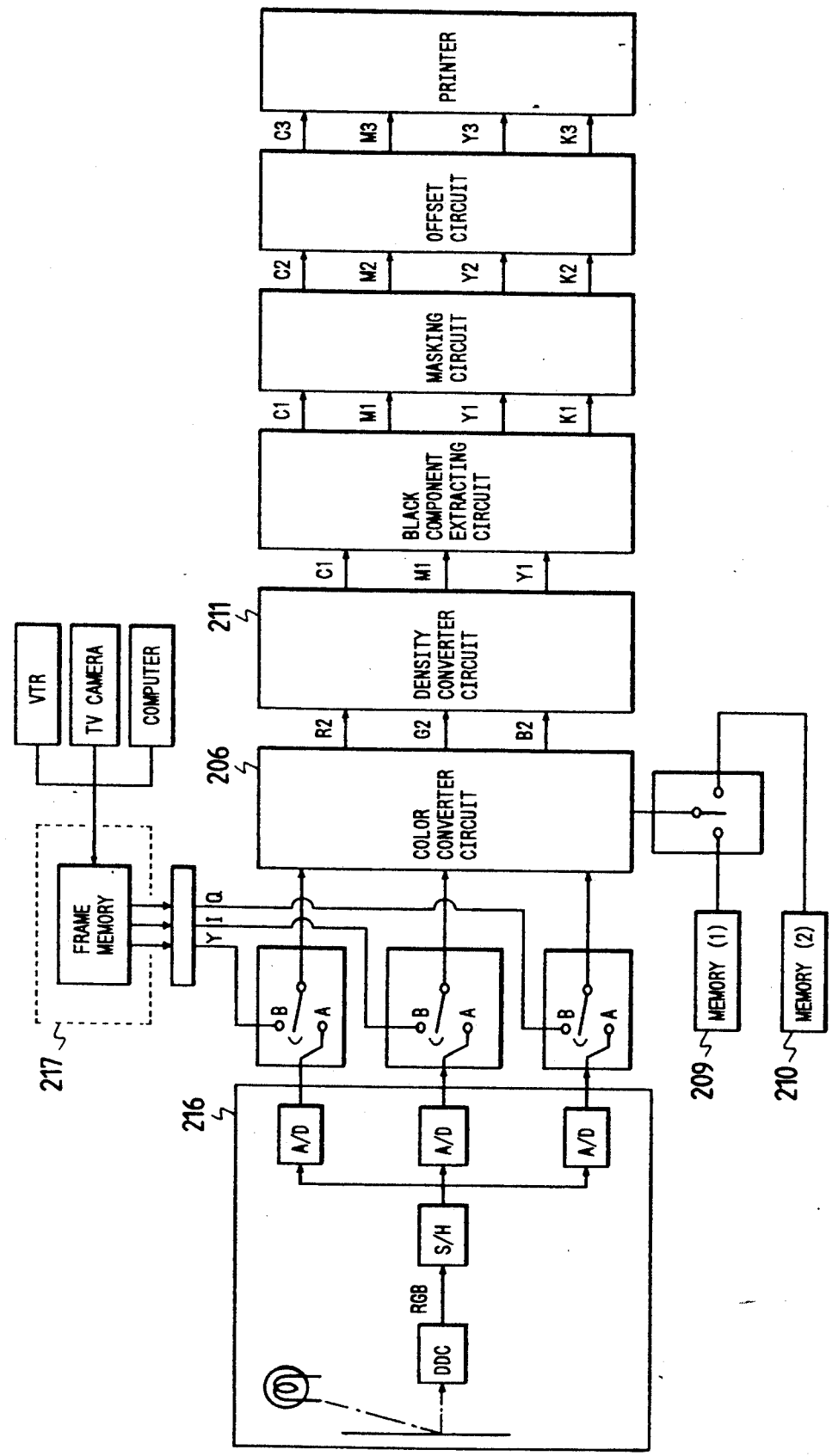
FIG. 10 is a block diagram of a color recording apparatus equipped with another prior art color signal converter.
Figure 11:
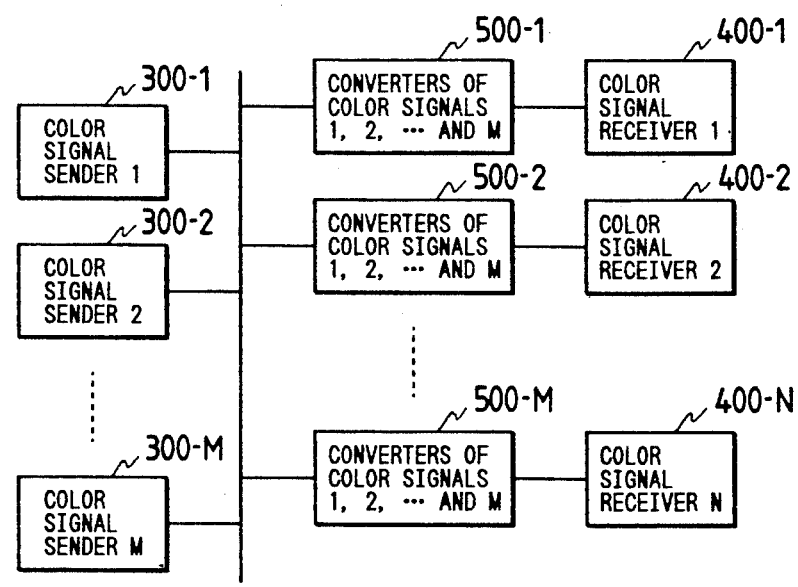
FIG. 11 is a schematic diagram of a network in which senders output their internal color signals, or their own formats of color representation, unaltered.
Figure 12:
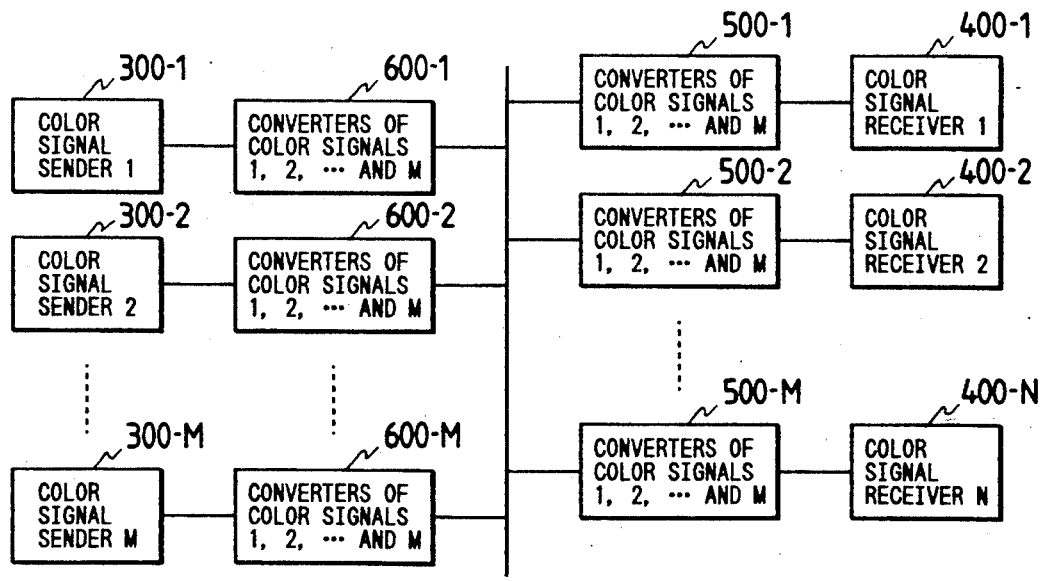
FIG. 12 is a schematic diagram of a network in which senders output their internal color signals after conversion to standard device independent color signals.

FIG. 8 is a block diagram showing a color copier equipped with a color signal converter, except the coefficient memory and CPU, according to a seventh embodiment of the present invention.

The color copier has four modes, copy mode, print mode, scanner mode and synthesis mode.

In a copy mode, the output of a color signal generating means (scanner) 74 is supplied into a 3× n color correcting matrix circuit 87 where it is converted to the amounts of inks that are to be deposited on a recording sheet. The value of n is assumed to be 3 in the embodiment under discussion but if more accurate color reproduction is required, the circuit 87 may contain higher-order terms and/or three one-dimensional LUTs that change the forms of curves in color signals. Subsequently, a black generating circuit 71 performs conversion to four color signals including a signal for the amount of black ink. Theses signals are sent to four one-dimensional LUTs 72, where they are converted to signals that are appropriate for the characteristics of a printer 73 and which thence are supplied to the printer 73 for printing on the recording sheet.

In a print mode, various color signals supplied over a network 8 are converted to X, Y and Z by passage through a 3×3 matrix computing circuit 1, three one-dimensional LUTs 2 and a 3×3 matrix computing circuit 3 in the same manner as already described in connection with the first embodiment. In a color correcting circuit 87, the associated coefficients are changed by a rewriting means (not shown) and Cp, Mp and Yp are calculated from said X, Y and Z. The subsequent procedures are the same as in the copy mode.

In a scanner mode, the output of the color signal generating means is converted to X, Y and Z in the color correcting circuit 87 in the same manner as already described in connection with the third embodiment. Said X, Y and Z are then converted to various color signals by passage through the 3×3 matrix computing circuit 3, three one-dimensional LUTs 2 and the 3×3 matrix computing circuit 1, which color signals are subsequently sent out to the network 8.

In a synthesis mode, the output of the color signal generating means is first converted to X, Y and Z in the 3 × n color correcting matrix 87 and thence supplied to a memory 52, where they are composite with data of various color signals that are supplied over the network 8 and that have been coverted to X, Y and Z by passage through the 3×3 matrix computing circuit 1, three one-dimensional LUTs 2 and 3×3 matrix computing circuit 3. Thereafter, the color correcting circuit 87 calculates the amounts of three color inks from said X, Y and Z. The subsequent procedures are the same as in the copy mode.

As regards the specific coefficients and constants that are to be used in the four modes of the color copier, discussions have already been made in the previous embodiments and need not be repeated here. The basic cricuit configuration of the embodiment under consideration is the saem as that of the first embodiment but it may be biased on the circuit shown in the second mebodiemnt. In this alternative case, the foregoing description holds good if the X, Y and Z signals in the four modes are replaced by CIE LAB signals.

As described on the foregoing pages, accordig to the presnt invention, a color converter that is capable of conversions between varous kinds of color signals appropriate for use over a network (i.e., RGB signals, various luminance/chromaticity separated signals that are expressed by linear transformations of said RGB signals, and CIE LAB signals, which signals may or may not be gamma-corrected) and the internal color signals of devices connected to the network can be realized by rewriting associated coefficients and constants using the same circuit. Therefore, accurate color conversions can always be accomplished with an inexpensive system layout.

What is claimed is:

1. A color recording apparatus comprising a first matrix computing means for performing matrix operations on input color signals, a gamma transforming means for subjecting the results of computation with said first matrix computing means to gamma-transformation, a second matrix computing means for performing matrix operations on the output of said gamma transforming means, a recording means for performing recording on a recording sheet on the basis of the results of computation with said second matrix computing means, and a rewriting means for rewriting the coefficients of matrices in said first and second matrix computing means and the constants used in said gamma transforming means.

2. The color recording apparatus as defined in claim 1 wherein said first matrix computing means performs matrix operations on CIE LAB signals to be converted to intermediate signals $f(X/X_0)$, $f(Y/Y_0)$ and $f(Z/Z_0)$ according to $$f(X/X_0) = a^*/500 + L^*/116$$

$$f(Y/Y_0) = L^*/116$$

$$f(Z/Z_0) = L^*/116 - b^*/200.$$

3. The color recording apparatus as defined in claim 1 wherein said gamma transforming means subjects the intermediate signals to gamma-transformation to obtain X, Y and Z.

4. The color recording apparatus as defined in claim 1 wherein coefficients of matrices in said second matrix computing means are each a unit matrix.

5. The color recording apparatus as defined in claim 1 wherein upon entry of NTSC YIQ signals as the input color signals, said rewriting means operates to change the coefficients of matrices in said first and second matrix computing means to values represented by $$Rn = 1.00Y + 0.96I + 0.63Q$$

$$Gn = 1.00Y - 0.28I - 0.64Q$$

$$Bn = 1.00Y - 1.11I + 1.72Q, \text{ and}$$

constants to be used in said gamma transforming means are rewritten to 1 and coefficients for the matrix operations to be performed by said second matrix computing means are rewritten in such a way that said second matrix computing means performs operations expressed by $$X = 0.608Rn + 0.174Gn + 0.200Bn$$
$$Y = 0.299Rn + 0.587Gn + 0.114Bn$$
$$Z = \phantom{0.000Rn + {}} 0.0662Gn + 1.112Bn.$$

6. A color signal outputting apparatus comprising a means of generating color signals, a first matrix computing means for performing matrix operations on the output of said signal generating means, a gamma transforming means for subjecting the results of computation with said first matrix computing means to gamma-transformation, a second matrix computing means for performing matrix operations on the output of said gamma transforming means, and a rewriting means for rewriting the coefficients of matrices in said first and second matrix computing means and the constants used in said gamma transforming means.

7. A color signal editing apparatus comprising a first matrix computing means for performing matrix operations on input color signals, a gamma transforming means for subjecting the results of computation with said first matrix computing means to gamma transformation, a second matrix computing means for performing matrix operations on the output of said gamma transforming means, a processing means for editing the results of computation with said second matrix computing means, and a rewriting means for rewriting the coefficients of matrices in said first and second matrix computing means and the constants used in said gamma transforming means.

8. A color signal storage apparatus comprising a first matrix computing means for performing matrix operations on input color signals, a gamma transforming means for subjecting the results of computation with said first matrix computing means to gamma-transformation, a second matrix computing means for performing matrix operations on the output of said gamma transforming means, a storage means for storing the results of computation with said second matrix computing means, and a rewriting means for rewriting the coefficients of matrices in said first and second matrix computing means and the constants used in said gamma transforming means.

9. A network system comprising:
a color signal outputting apparatus comprising a means of generating color signals, a first matrix computing means for performing matrix operations on the output of said signal generating means, a first gamma transforming means for subjecting the results of computation with said first matrix computing means to gamma-transformation, a second matrix computing means for performing matrix operations on the output of said first gamma transforming means, and a first rewriting means for rewriting the coefficients of matrices in said first and second matrix computing means and the constants used in said first gamma transforming means;
a color recording apparatus comprising a third matrix computing means for performing matrix operations on input color signals, a second gamma transforming means for subjecting the results of computation with said third matrix computing means to gamma transformation, a fourth matrix computing means for performing matrix operations on the output of said second gamma transforming means, a recording means for performing recording on a recording sheet on the basis of the results of computation with said fourth matrix computing means, and a second rewriting means for rewriting the coefficients of matrices in said third and fourth matrix computing means and the constants used in said second gamma transforming means; and
a network that connects said color signal outputting apparatus and said color recording apparatus.

10. A color copier comprising a first matrix computing means for performing matrix operations on input color signals, a gamma transforming means for subjecting the results of transformation, a second matrix computing means for performing matrix operations on the output of said gamma transforming means, a recording means for performing recording on a recording sheet on the basis of the results of computation with said second matrix computing means, and a rewriting means for rewriting the coefficients of matrices in said first and second matrix computing means and the constants used in said gamma transforming means.

* * * * *

UNITED STATES PATENT AND TRADEMARK OFFICE
CERTIFICATE OF CORRECTION

PATENT NO.   :   5,146,328
DATED        :   September 08, 1992
INVENTOR(S)  :   Toru Yamasaki et al.

It is certified that error appears in the above-identified patent and that said Letters Patent is hereby corrected as shown below:

Claim 10, column 24, line 48, change "transformation" to --computation with said first matrix computing means to gamma-transformation--.

Signed and Sealed this

Eighteenth Day of January, 1994

BRUCE LEHMAN

Attest:

Attesting Officer

Commissioner of Patents and Trademarks